June 22, 1965 H. D. ALDERSON 3,191,018
SAFETY LIGHT
Filed Jan. 18, 1962
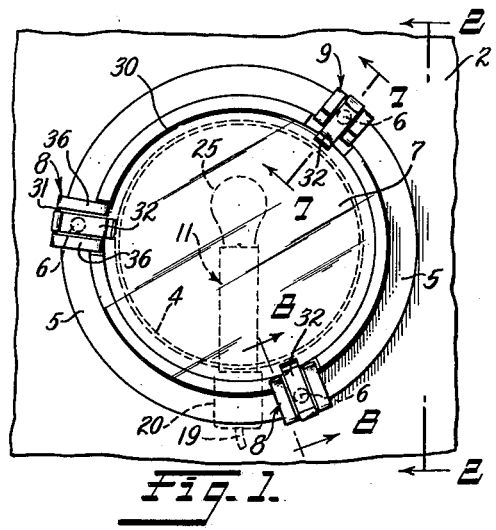
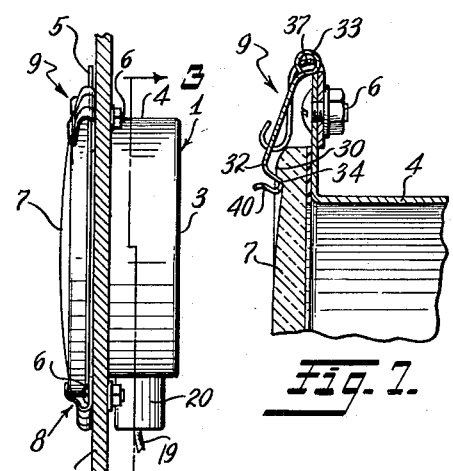
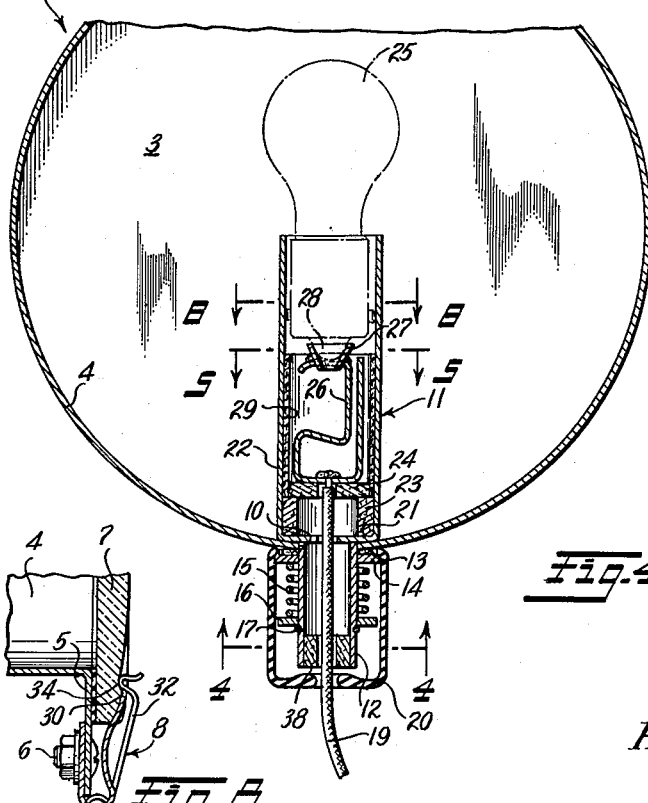
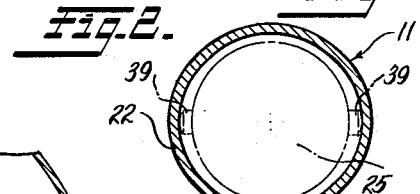
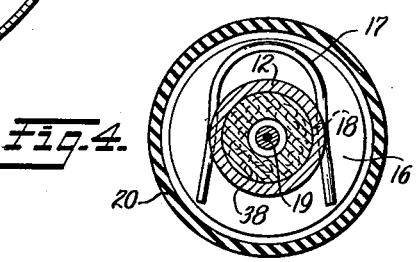
INVENTOR.
Harold D. Alderson
BY
Bacon & Thomas
ATTORNEYS

United States Patent Office 3,191,018
Patented June 22, 1965

3,191,018
SAFETY LIGHT
Harold D. Alderson, 309 Pearl St., Rockford, Ind.
Filed Jan. 18, 1962, Ser. No. 167,025
4 Claims. (Cl. 240—8.2)

The present invention relates generally to a safety light for trucks, trailer and other vehicles, and, more particularly, to a safety light in which the bulb is resiliently mounted to prevent damage from vibration and in which the bulb is easily accessible for replacement, and the socket assembly is readily accessible for repair.

Trucks and trailers have a large number of safety lights, such as tail lights and clearance lights, on their rear ends and side walls. These light are subjected to a considerable amount of jarring and vibration which frequently causes damage to the bulb filaments or the socket structures. This results in a safety hazard, which constitutes a traffic violation in most jurisdictions and also involves an expense for buying new bulbs and a constant maintenance problem. The damage to the bulbs is caused by the fact that in present safety lights the bulbs are rigidly mounted and thus subjected to all the vibration and jarring of the truck or trailer. Further, upon failure of the bulbs, the maintenance of the present safety lights is complicated by the difficulty in gaining access to and removing these bulbs. When damage occurs in the socket assembly the entire unit must be replaced because no provision is made for gaining access to the wiring and other parts inside.

It is therefore an object of this invention to provide a safety light in which the bulb is mounted so as to minimize its vibration.

A further object is to provide a safety light in which the bulb is resiliently mounted to reduce the vibration transmitted from the safety light housing to the bulb.

A still further object of this invention is to provide a safety light which is designed so that the bulb may be easily and quickly replaced in order to reduce maintenance costs.

Another object is to provide a light which is economical to manufacture, durable in use and convenient to repair when damaged.

These and other objects and advantages will be fully apparent from the following description and the accompanying drawing, in which:

FIGURE 1 is a front elevation view of a safety light embodying the invention;

FIGURE 2 is a side view, partially in section, of the safety light;

FIGURE 3 is a sectional view on the line 3—3 of FIGURE 2;

FIGURE 4 is a sectional view on the line 4—4 of FIGURE 3;

FIGURE 5 is a sectional view on the line 5—5 of FIGURE 3;

FIGURE 6 is a sectional view on the line 6—6 of FIGURE 3;

FIGURE 7 is a sectional view on the line 7—7 of FIGURE 1; and

FIGURE 8 is a sectional view on the line 8—8 of FIGURE 1.

Referring now to the drawings and, more particularly, to FIGS. 1 and 2, there is shown a safety light having a housing 1 adapted for installation in the body 2 of a truck, trailer or similar vehicle. The housing 1 has a back wall 3, and an open front. A flange 5 extends outwardly from the side wall 4 and is adapted to fit against a portion of the vehicle body 2. The safety light is mounted by means of three bolts 6 which fit through aligned holes in the flange 5 and the vehicle body 2.

The open front of the housing 1 is covered by a lens 7, which is held in place by two resilient clamps 8 and a third clamp 9. The clamps 8 are generally U-shaped with one leg being provided with a hole to permit the insertion of one of the bolts 6 and the other leg comprising two spaced apart extensions 36. A portion of the curved surface between the legs of the clamps 8 is cut out leaving a crosspiece 31 between the cut out portion and the area between the extensions 36.

Clamp 9 is similar to clamps 8 except that the ends of the extensions 36 are bent upward and are connected by a crosspiece 37.

The three clamps 8 and 9 are mounted on the flange 5 by the same bolts 6 which secure the safety light to the vehicle body. The portion of the clamps through which the bolts 6 pass is flat and abuts against the rear of the flange 5. The clamps curve around the front of the safety light and fit over the lens 7, which is provided with a slightly raised portion 30 about its perimeter.

The lens 7 is locked in place by means of clips 32 which have a partially open loop 33 formed at one end and a generally U-shaped bend 40 formed at the other end. The partially open loop 33 fits about one of the crosspieces 31 while the generally U-shaped bend 40 locks into the groove 34 formed by the raised edge 30 of the lens 7.

In practice, the lens is fastened in place by sliding it under clamps 8 and then snapping it under clamp 9. The spring clips are then rotated about the crosspieces 31 and snapped into the groove 34. As is evident, this is a simple, quick procedure requiring no tools.

As shown in FIG. 3, the sidewall 4 contains a hole 10 in which the bulb mounting 11 is fastened. The lower end of the bulb mounting comprises a generally cylindrical stem 12 which projects downward through the hole 10. A fiber gasket 13 and a metal washer 14 are mounted on the stem 12 immediately below wall 4. A coil spring 15 fits over the cylindrical stem 12 with one end abutting the washer 14. The coil spring 15 is held under compression by a metal washer 16 which is mounted on the stem 12 below the spring. As shown in FIG. 4, the washer 16 is held in place by a U-shaped piece of heavy wire 17 which fits into slots 18 cut in the stem 12 and presses against the side of washer 16 opposite the one in contact with the coil spring 15. A wire 19 is positioned through the center of cylindrical stem 12 and is held in place by an insulating plug 38 located between the wire and the cylindrical stem 12. A rubber sleeve 20 is secured at its upper edge between wall 4 and washer 14 and fits over the cylindrical stem 12 and its associated parts to protect the same from moisture and dust.

The upper end of the cylinderical stem 12 is welded to the end piece 21 of a cup-shaped socket 22 which is positioned entirely within the housing 1. An insulating sleeve 23 is positioned at the bottom of socket 22 with one end abutting end piece 21, and an insulating gasket 24 is disposed thereabove against the opposite end of insulating sleeve 23.

The upper end of the socket 22 opposite the end piece 21 is open and is adapted to receive a light bulb 25. As illustrated in FIG. 6, the bulb fits snugly into socket 22 with the prongs 39 of the bulb forcing socket 22 slightly out of round. Interposed between the bulb 25 and the insulating gasket 24 is a sinuous spring contact member 26 having a cup-shaped structure 27 at the upper end thereof to receive the bulb contact 28. The wire 19 is secured to the bottom of contact member 26 and an insulating sleeve 29 prevents shorting between the contact member 26 and the socket 22.

It is thus evident that the bulb mounting assembly 11 is resiliently clamped to the housing 1 by the spring 15 and the bulb is resiliently supported in the bulb mounting assembly 11 by the spring 26. This combination of resilient holding means effectively minimizes the vibrations transmitted to the bulb.

The bulb mounting assembly is designed so that its various parts are readily accessible in case repairs are required. The whole bulb mounting 11 assembly may be taken out of the housing 1 by removing the rubber sleeve 20, sliding off the U-shaped wire 17 which holds the fittings on the stem 12 and pulling the stem through the hole 10. Contact member 26 and the other internal fitting of cup-shaped socket 22 may be removed by taking out the bulb 25 and then sliding the fittings through the open end of the cup-shaped socket. The wire 19 should be long enough to permit the contact member 26 to be pulled free of the housing 1.

While a specific embodiment of the invention has been shown and described in detail to illustrate the principles of the invention, it will be understood that the invention may be embodied otherwise and that the invention includes all modifications encompassed within the spirit and scope of the following claims.

I claim:

1. A safety light for a vehicle, wherein vibrations transmitted to a bulb are minimized, comprising: a housing; a bulb mounting assembly resiliently secured to said housing, said bulb mounting assembly including a stem secured to a cup-shaped socket, said cup-shaped socket containing a sinuous spring contact member adapted to resiliently support a bulb, said stem extending through a hole in said housing said cup-shaped socket being larger in diameter than said hole so that movement of said cup-shaped socket towards said stem is constrained, a collar secured to said stem; and a coil spring mounted under compression between said collar and said housing thereby resiliently clamping the cup-shaped socket against the housing.

2. The safety light of claim 1 wherein said collar is held against the compressive force of said coil spring by a U-shaped member which fits into slots in said stem.

3. The safety light of claim 1 wherein said sinuous spring contact member includes a cup-shaped structure which fits around the contact point of said bulb.

4. A safety light for a vehicle wherein vibrations transmitted to a bulb are minimized, comprising a housing, a flange extending about the front of said housing, said housing being open at the front end and a lens having a raised portion about its edge covering said opening, said lens being attached to said flange by clamps on said flange which bend over the edge of said lens and overlie a portion of the top of the lens and by spring clips rotatably attached to said clamps which snap over the raised portion of said lens; a bulb mounting assembly secured to said housing, said bulb mounting assembly including a stem secured to a cup shaped socket, said stem fitting through a hole in said housing, a collar secured to said stem and a coil spring mounted under compression between said collar and said housing thereby resiliently clamping the cup shaped socket against the housing.

References Cited by the Examiner

UNITED STATES PATENTS

| 1,299,909 | 4/19 | Burgess | 240—10.66 |
| 1,604,836 | 10/26 | Moldenhauer | 240—90 |
| 2,151,903 | 3/39 | Douglas | 339—127 |
| 2,175,844 | 10/39 | Laystrom | 240—90 X |
| 2,289,514 | 7/42 | Mastney et al. | |
| 2,712,117 | 6/55 | Stinson | 339—256 X |
| 2,760,674 | 8/56 | Karp | 220—55 |
| 2,763,774 | 9/56 | Beach et al. | 240—41.55 X |
| 2,903,570 | 9/59 | Worden | 240—8.2 X |
| 3,066,218 | 11/62 | Woodcock | 240—90 X |

NORTON ANSHER, *Primary Examiner.*